(12) United States Patent
Borter

(10) Patent No.: US 6,315,057 B1
(45) Date of Patent: Nov. 13, 2001

(54) QUICK CHANGE SWEEP APPARATUS

(76) Inventor: Thomas W. Borter, 406 S. Rockford #7, Tempe, AZ (US) 85281

( * ) Notice: Subject to any disclaimer, the term of this patent is extended or adjusted under 35 U.S.C. 154(b) by 0 days.

(21) Appl. No.: 09/499,126

(22) Filed: Feb. 7, 2000

(51) Int. Cl.$^7$ ................................................. A01B 15/02
(52) U.S. Cl. ................................................ 172/753; 172/762
(58) Field of Search ................................. 172/744, 753, 172/762, 772, 772.5, 681, 721, 729, 734, 736, 738

(56) References Cited

U.S. PATENT DOCUMENTS

| | | | |
|---|---|---|---|
| 2,595,353 | * 5/1952 | Graham . | |
| 2,688,475 | * 9/1954 | Small . | |
| 3,007,533 | * 11/1961 | Hill . | |
| 3,357,117 | * 12/1967 | Petersen . | |
| 3,773,114 | * 11/1973 | Griffin | 172/762 |
| 3,792,736 | * 2/1974 | Gondeiro | 172/762 X |
| 4,115,021 | * 9/1978 | Loch | 403/353 |
| 4,190,115 | * 2/1980 | Couture | 172/753 |
| 4,195,697 | * 4/1980 | Griffin | 172/744 X |
| 4,779,686 | * 10/1988 | Ryan | 172/730 |
| 5,579,852 | * 12/1996 | Woodward et al. | 172/762 X |
| 5,711,378 | * 1/1998 | Yeager | 172/762 X |
| 5,941,318 | * 8/1999 | Bergen | 172/762 X |

* cited by examiner

Primary Examiner—Christopher J. Novosad
(74) Attorney, Agent, or Firm—H. Gordon Shields

(57) ABSTRACT

Sweep apparatus may be easily secured to and removed from a tine by a pair of flex pins. The sweep includes a plate and a pair of side flanges extending downwardly from the plate through which the flex pins extend. An adapter shoe is used to secure the sweep to a tine, or a tine may directly include a pair of laterally extending bores against which the flanges of the sweep are disposed and through which the flex pins extend to secure the sweep to the tine without the adapter shoe.

3 Claims, 4 Drawing Sheets

QUICK CHANGE SWEEP APPARATUS

BACKGROUND OF THE INVENTION

1. Field of the Invention

This invention relates to sweep elements and, more particularly, to sweep apparatus which may be easily and quickly removed from a tine and secured to the tine.

2. Description of the Prior Art

Sweep elements are used in contemporary "nor till farming" for cutting vegetation and lifting up ground for planting and fertilizing. The ground is thus minimally disturbed, which results in less erosion than plowing and discing.

Sweep elements of the prior art are typically welded or bolted to tines which are in turn secured to a tractor, or other machine. A fine typically is spring loaded to some machine, and the sweep is typically fastened to the bottom of the tine by bolts. The bolts get beat up, destroyed, etc., during the work performed by the sweep. The bolts go directly through the sweep and tine and, when they are distorted, beat up, etc., are very difficult to remove. Accordingly, in many cases sweeps must be cut off from a tine with a torch.

The sweep apparatus of the present invention overcomes the problems of the prior art by using a pair of flex pins to secure a sweep to an adapter shoe which is in turn secured to a tine by a pair of bolts, or, in an alternate embodiment, a sweep is secured directly to a differently designed tine.

SUMMARY OF THE INVENTION

The invention described and claimed herein comprises a sweep element which is pinned to an adapter shoe by a pair of flex pins. The shoe is secured to an existing tine by a pair of bolts. In the alternative, a tine may include a pair of laterally extending bores or holes and a sweep of the present invention may be secured directly thereto. The sweep includes a pair of side flanges through which the flex pins extend to secure the sweep to the shoe or directly to the tine.

Among the objects of the following invention are the following:

To provide new and useful sweep apparatus;

To provide new and useful sweep apparatus including a front panel and a pair of side panels through which extend holes or apertures for receiving flex pins;

To provide a new and useful shoe adapter for holding to a tine and for receiving a sweep; and To provide new and useful sweep apparatus which is easily removed from and secured to a tine.

DESCRIPTION OF THE PREFERRED EMBODIMENT

Figure 1:
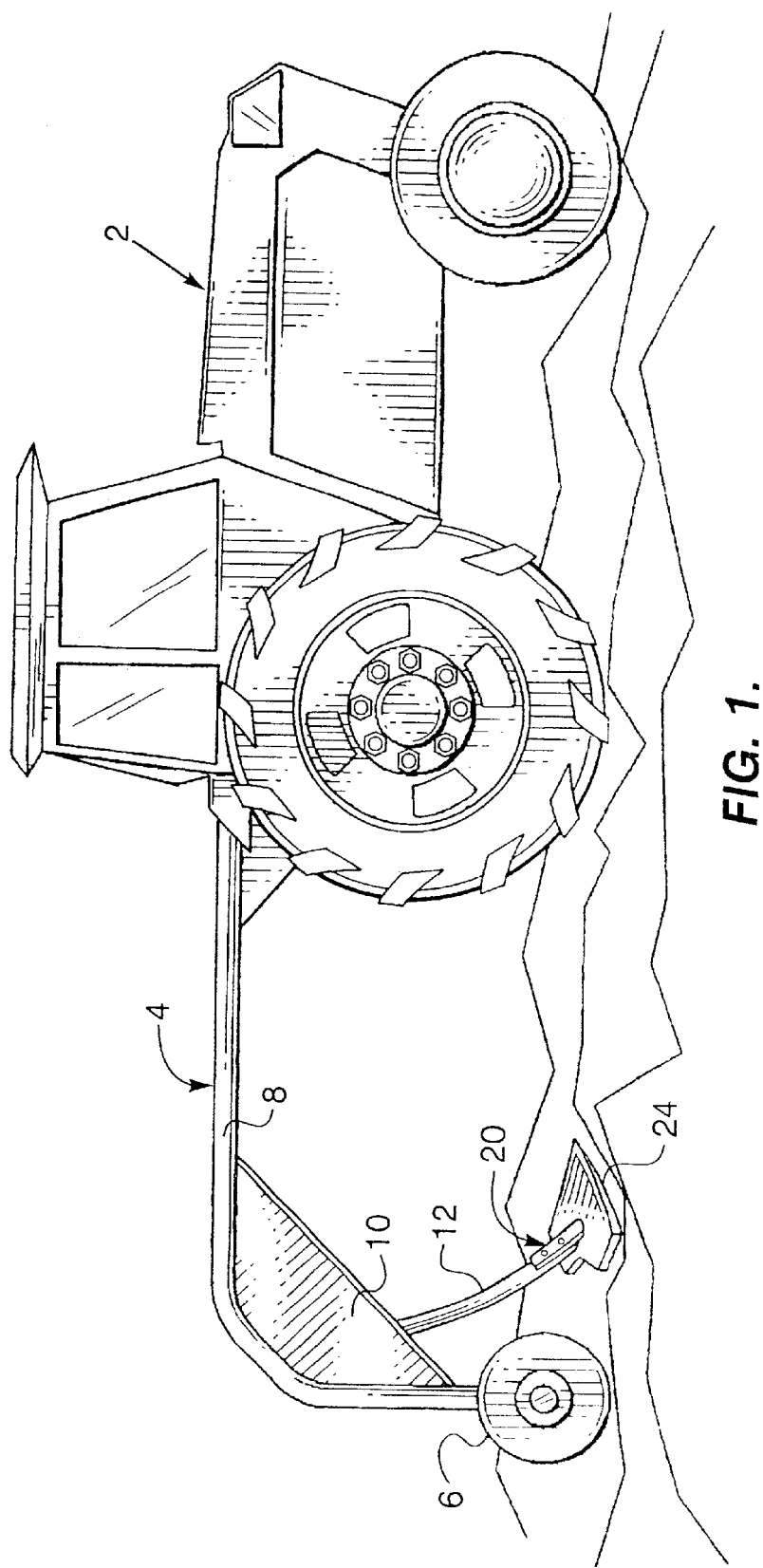
FIG. 1 is a side view illustrating the use environment of the apparatus of the present invention.

FIG. 1 is a side view of a tractor 2 towing an implement 4. The implement 4 includes a wheel 6 secured to the lower end of a bar 8. A gusset 10 is appropriately secured to the bar 8 and a tine 12 extends downwardly from the gusset 10. Sweep apparatus 20 of the present invention is secured to the tine 12.

Figure 2:
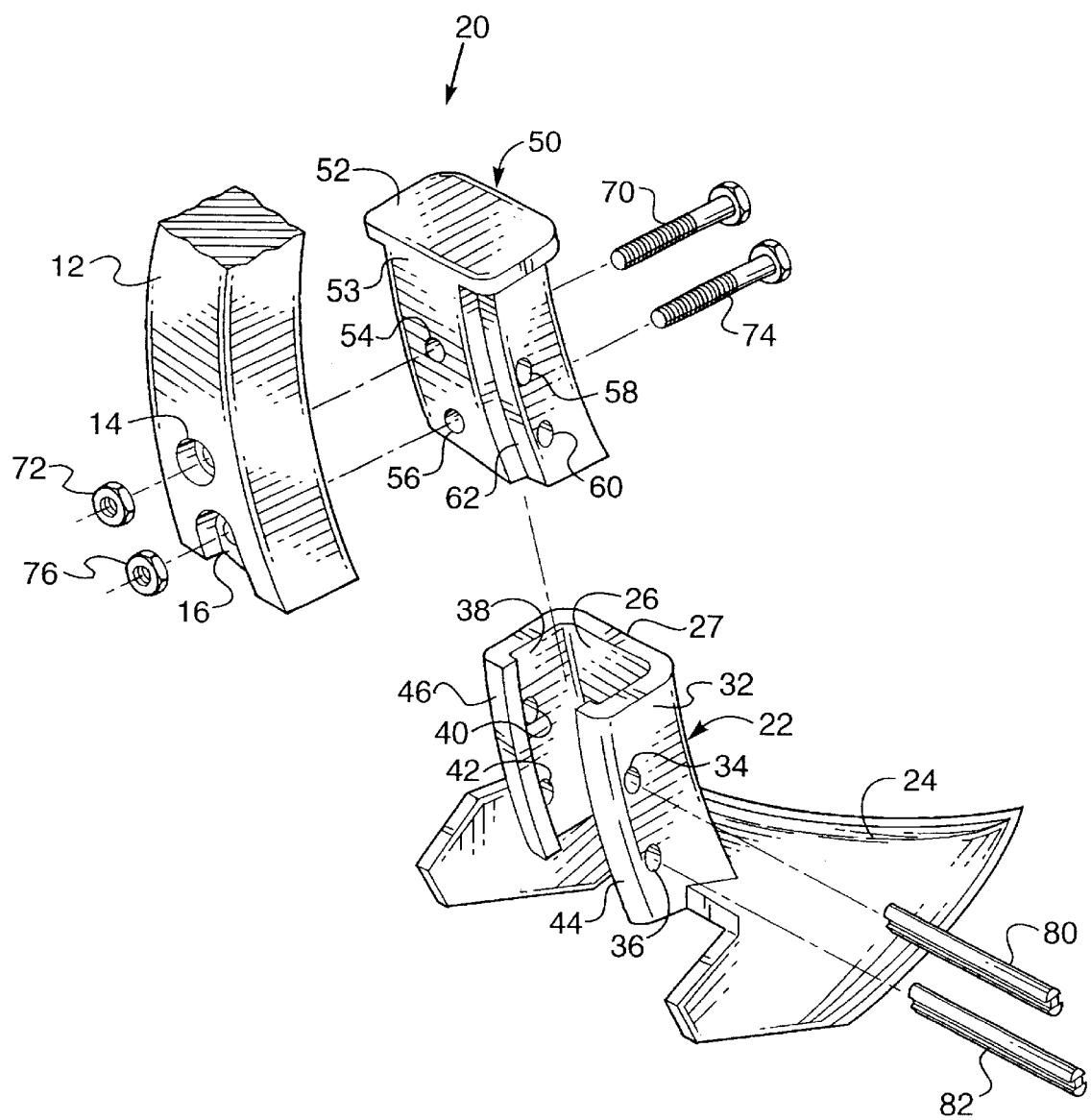
FIG. 2 is an exploded perspective view of the apparatus of the present invention.
Figure 3:
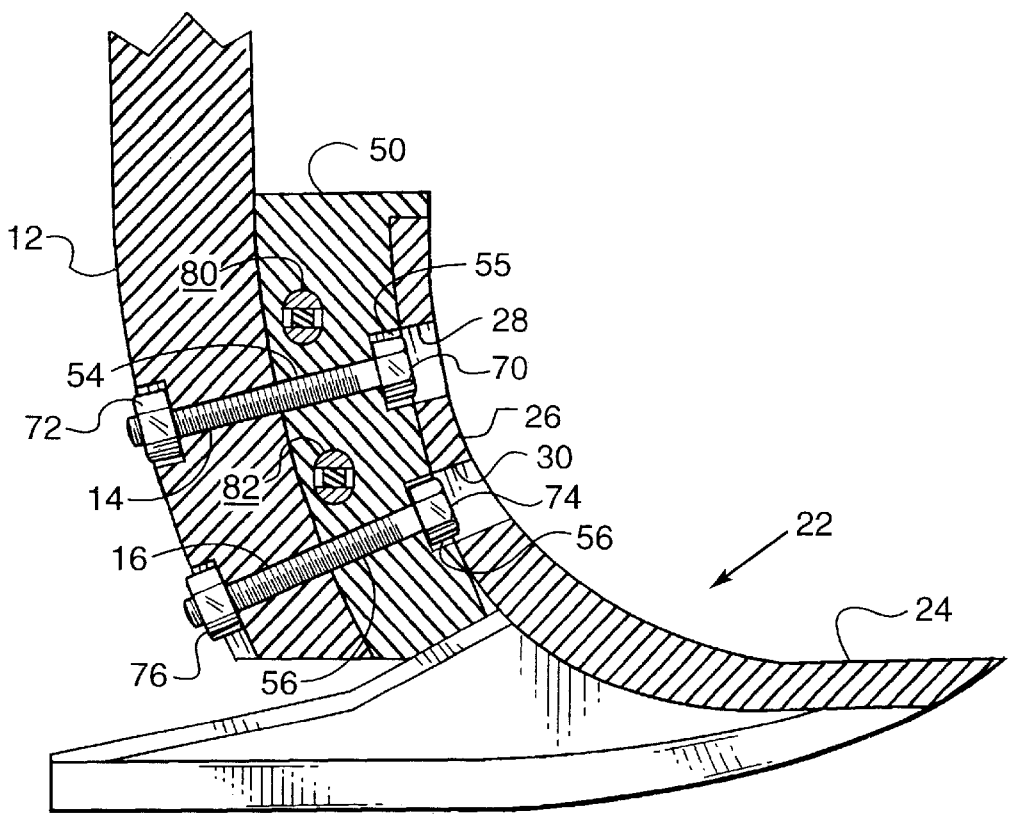
FIG. 3 is a side view in partial section of the apparatus of the present invention.
Figure 4:
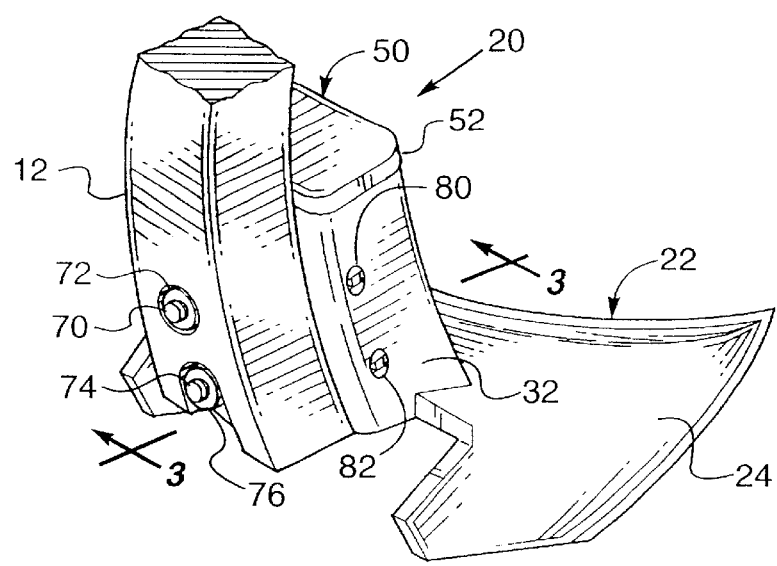
FIG. 4 is a perspective view of the assembled apparatus of the present invention.

FIG. 2 is an exploded perspective view of a portion of the tine 12 with the sweep apparatus 20 of the present invention spaced apart therefrom. FIG. 3 is a side view in partial section of the sweep apparatus 20 as secured to the lower portion of the tine 12. FIG. 4 is a perspective view of the sweep apparatus 20 secured to the lower portion of the tine 12. For the following discussion, reference will be made to FIGS. 1, 2, 3, and 4.

The tine 12 includes two bores extending through the tine between the front and rear surfaces of the tine, including an upper bore 14 and a lower bore 16. The bores 14 and 16 are used to secure an adapter shoe 50 to the lower portion of the tine 12.

The shoe 50 is spaced apart from the lower portion of the tine 12 in FIG. 2, and in FIGS. 3 and 4, the shoe and the sweep apparatus 20 are secured to the lower portion of the tine 12.

The sweep apparatus 20 includes a sweep 22 and the shoe 50 secured to the lower portion of the tine 12. The sweep 22 includes a plow blade 24 secured to an upwardly extending extension 26. Extending through the extension 26 are two apertures, an upper aperture 28 and a lower aperture 30. The sweep 22 also includes a pair of side panels which are generally perpendicular to the extension 26. The panels include a side panel 32 and a side panel 38. Extending through the side panel 32 are two apertures, an upper aperture 34 and a lower aperture 36. Extending through the side panel 38 are two apertures aligned with the apertures 34 and 36. They include an upper aperture 40 and a lower aperture 42. The aligned apertures 34, 40, and 36, 42 receive a pair of flex pins, including a flex pin 80 and a flex pin 82 to secure the sweep 22 to the shoe 50.

A relatively short flange 44 extends inwardly from the side panel 32. The flange 44 is generally parallel to the front extension 26. A similar and aligned flange 46 extends inwardly from the side panel 38.

The shoe 50 includes a top flange 52 which extends outwardly on three sides of the shoe 50. The shoe 50 includes a relatively smooth back or rear face 53 which is disposed against the front face of the tine 12 when the shoe 50 is secured to the tine.

Extending through the shoe 50 are two bores, including a top bore 54 and a lower bore 56. The bores 54 and 56 are aligned, respectively, with the bores 14 and 16 of the tine 12. Each bore includes a counterbore. The bore 54 includes a counterbore 55, and the bore 56 includes a counterbore 57.

Inwardly from the rear face 53 of the shoe 50 are two grooves or recesses. They include a recess 52, shown best in FIG. 2, and a parallel and aligned recess on the opposite side of the shoe 50.

The shoe 50 is secured to the tine 12 by a pair of bolts 70 and 74 which extend respectively through the aligned bores 54 and 14 and 56 and 16. A pair of nuts 72 and 76 are used to secure the bolts 70 and 74 tightly to secure the shoe 50 to the tine 12. The heads of the bolts 70 and 74 are disposed within the counterbores 55 and 57, respectively.

The flanges 44 and 46 extend into the side recesses or grooves of the shoe 50 when the sweep 22 is disposed against the shoe 50. The configuration of the extension 26, of course, matches the configuration of the shoe 50, and also of the tine 12. The heads of the bolts 70 and 74 extend into the apertures 28 and 30 of the extension 26 of the sweep 22. A top rim 27 at the top of the extension 27, the sides 32 and 38, and the flanges 44 and 46 is disposed against the bottom of the top flange 52 to limit the upward movement of the sweep 22 relative to the shoe 50 and the tine 12. As indicated above, the flex pins 80 and 82 extend through the aligned apertures 34, 36, and 40, 42 of the sweep 22 and, of course, also through a pair of bores 58 and 60 in the shoe 50 to secured the sweep 22 to the extension 50 and, accordingly to secure the sweep 22 to the tine 12. The bores 58 and 60 of the shoe 50 arc, of course, aligned with the respective bores 34, 40 and 36, 42 of the sweep 22 to allow the flex pins 80 and 82 to extend there through and the bores 58 and 60 are generally perpendicular to the bores 54 and 56.

When a sweep 22 is worn out, and needs to be changed, all that is necessary is to knock the flex pins 80 and 82 away from the sweep 22 and the shoe 50 and to insert a new sweep to the shoe and insert new flex pins to secure the sweep apparatus together.

Figure 5:
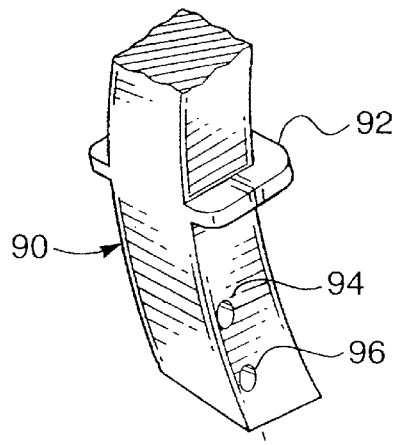
FIG. 5 is an exploded perspective view of an alternate embodiment of the apparatus of the present invention.
Figure 5:
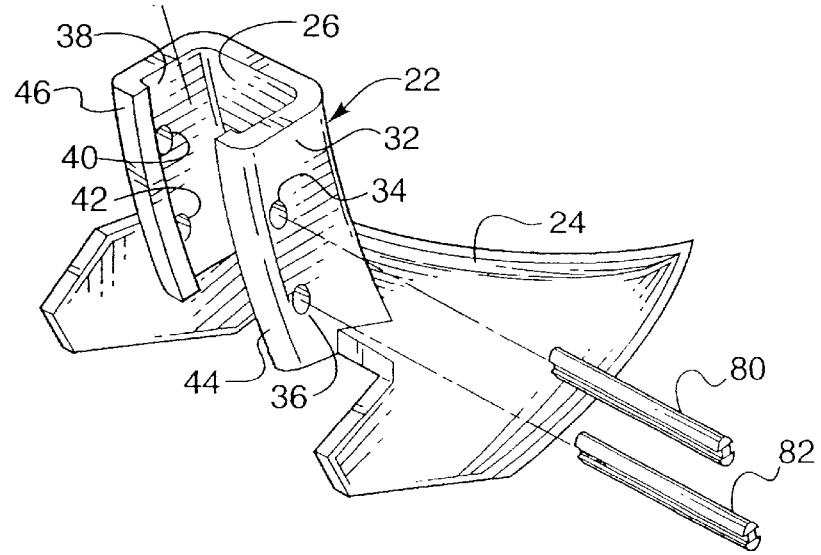

An alternate embodiment of the sweep apparatus 20 illustrated in FIGS. 2, 3, and 4 is shown in FIG. 5. The sweep apparatus illustrated in FIG. 5 includes a modified tine 90 which receives the sweep 22.

The modification of the tine 90 includes the provision of a stop ridge 92 which extends on the sides and front of the tine 90. Extending laterally through the tine 90 (that is, between the sides of the tine) are two bores, an upper bore 94 and a lower bore 96. The bores 94 and 96 are aligned with the bores 34, 40 and 36, 42, respectively of the sweep 22. Thus, the sweep 22 may be directly secured to the tine 90, eliminating the need for the shoe 50.

The flanges 44 and 46 of the sweep 22 extend about the tine 90, and, with the stop 92, prevent the sweep 22 from lateral or vertical movement relative to the tine 90. The flex pin 80 extends through the aligned aperture 34, bore 94, and aperture 40, and the flex pin 82 extends through the aligned aperture 36, bore 96, and aperture 42 to secure the sweep 22 directly to the tine 90.

It will be noted that the apertures 28 and 30 in the extension 26 are not needed for the embodiment of FIG. 5 in which the sweep 22 is secured directly to the modified tine 90, and the adapter shoe 50 is not used. Moreover, the apertures 28 and 30 are required only when it is desired to secure the shoe 50 and the sweep 22 to the tine 12 when the shoe 50 and the sweep 22 have been secured together prior to the installation on the tine 12, or for the removal of the shoe and sweep combination from the tine. Under normal circumstances, the shoe will be secured to the tine before the sweep 22 is secured to the shoe 50, and accordingly the apertures 28 and 30 are not needed.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Sweep apparatus comprising in combination:
   a tine adapted to be secured to a tractor, including a bar having front and rear surfaces and at least a first bore extending between the front and rear surfaces;
   an adapter shoe, including
      a rear face disposed against the front surface of the tine,
      a first bore aligned with the first bore of the tine,
      a first bolt extending through the aligned first bores for securing the adapter shoe to the tine, and
      a second bore generally perpendicular to the first bore;
   a sweep including
      a plow blade,
      an extension panel extending generally upwardly from the plow blade and disposed against the adapter shoe,
      a pair of side panels extending generally perpendicularly to the extension panel and disposed against the adapter shoe,
      a first pair of apertures extending through the side panels aligned with each other and with the second bore of the adapter shoe, and
      a first fastener element extend through the aligned apertures and second bolt for securing the sweep to the adapter shoe.

2. The apparatus of claim 1 in which the adapter shoe further includes a top flange extending outwardly on three sides, and the extension panel and side panels of the shoe are disposed against the top flange.

3. The apparatus of claim 1 in which the adapter shoe further includes a pair of recesses extending inwardly on the rear face, and the sweep includes a pair of flanges extending inwardly from the side panels and into the pair of recesses.

* * * * *